Jan. 12, 1971  H. J. HIRCHER III  3,553,964
PROPELLANT FEED SYSTEM FOR ROCKET POWERPLANTS
Filed Jan. 15, 1968  2 Sheets-Sheet 1
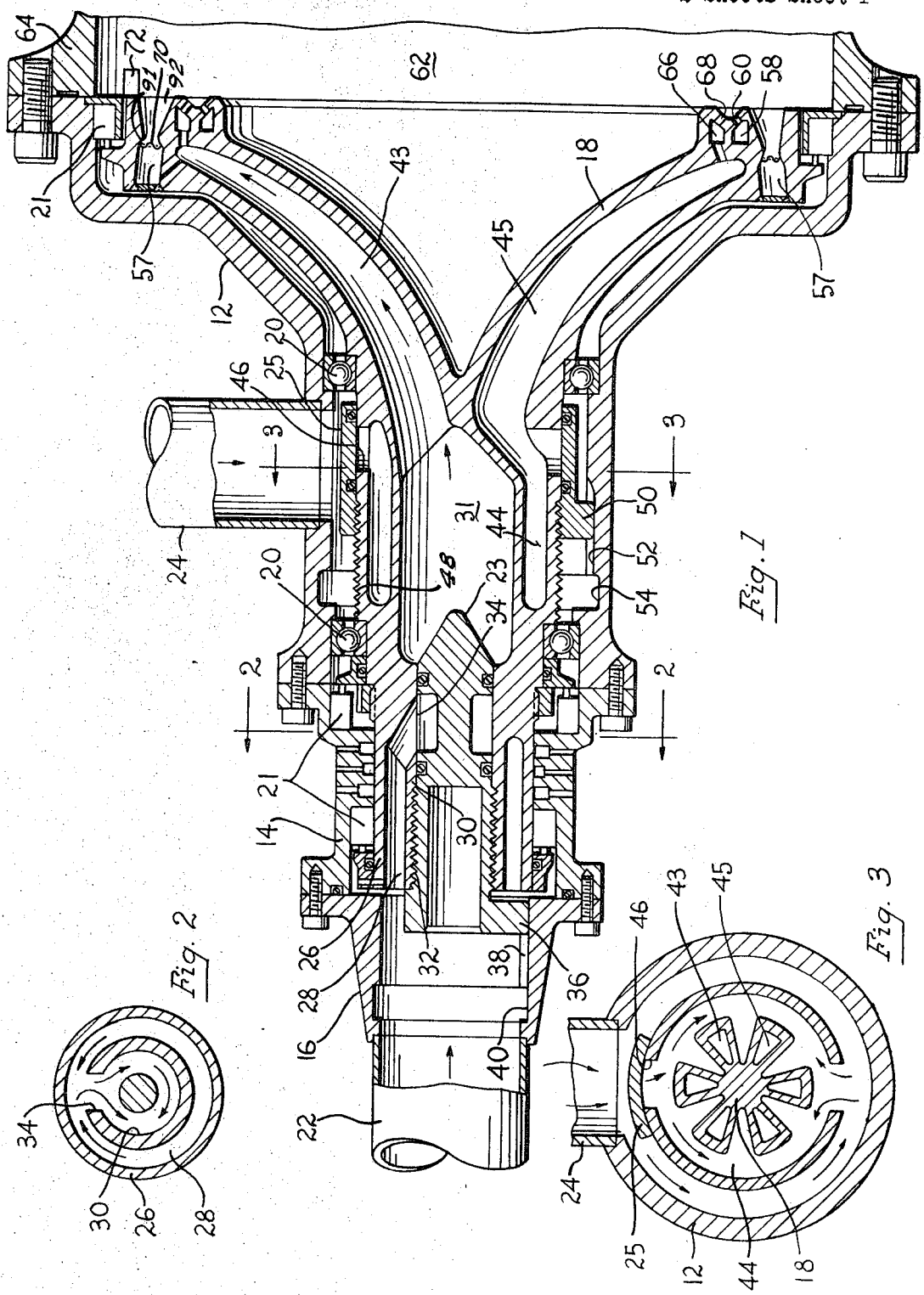
INVENTOR.
HARTMANN J. KIRCHER III
BY
William R. Wright Jr.
AGENT

United States Patent Office 3,553,964
Patented Jan. 12, 1971

3,553,964
PROPELLANT FEED SYSTEM FOR ROCKET POWERPLANTS
Hartmann J. Kircher III, Sparta, N.J., assignor to Thiokol Chemical Corporation, Bristol, Pa., a corporation of Delaware
Filed Jan. 15, 1968, Ser. No. 697,968
Int. Cl. F02k 9/00; F03g 1/02; F04d 1/00
U.S. Cl. 60—39.14                                 13 Claims

ABSTRACT OF THE DISCLOSURE

A pump for delivering one fluid or two fluids simultaneously which has a separate valve for each fluid which automatically opens upon rotation of the pump impeller without the use of exterior valve control means. Screw threads are employed on the impeller to cooperate with corresponding threads on each of the two valves, the valve sleeve in one instance and the poppet in the other instance. These valves are prevented from rotation with respect to the impeller and thus are screw threadedly retracted to open the valves as the impeller turns.

---

This invention relates generally to fluid handling systems and more particularly to fluid pumps and their flow-controlling valves for use in various applications and particularly in their application in combination with rocket powerplants employing a liquid propellant or propellants.

In the pumping of fluids, where two or more incompatible or hypergolic fluids are simultaneously handled by the pump, the two fluids must be kept separate until pumping starts and they thereafter reach their points of delivery. In such situation, one or more valves including suitable seals are employed which valves require operators and accuracy controls which involve weight and added size. This latter is extremely undesirable where the fluid pump is a part of the fuel system of a rocket, space vehicle, etc.

Liquid propellant rocket powerplants may employ: a monopropellant such as $H_2O_2$ which is passed over a catalyst to convert it to propulsive gases; non-hypergolic bi-propellants which are mixed together and ignited electrically in the rocket combustion chamber; or hypergolic propellants which ignite upon contact with each other. The propellant or propellants are supplied to the combustion chamber of the rocket powerplant by gas pressure, pumps, etc. in various ways in an attempt to obtain a maximum of combustion efficiency while avoiding accidental explosion, or premature firing of the rocket due to propellant leakage.

The main object of the present invention is to provide an improved propellant feeding, pumping, injecting and safety apparatus for rocket powerplants which is characterized by simplicity of design and a minimum of size and weight.

An important object of the present invention is to provide an improved fluid pump having one or more valves preventing fluid flow into the pump prior to its operation, and having novel operating means therefor.

Another important object of the present invention is to provide an improved fluid pump for handling two fluids simultaneously which includes separate fluid valves which are automatically operable to open position upon rotation of the fluid pump impeller without the use of exterior valve control means.

A further important object of the present invention is to provide an improved fluid pump for delivering one or more propellants to the combustion chamber of a rocket engine upon the opening of one or more valves by rotation of the pump impeller.

A still further important object of the present invention is to provide an improved fluid pump which is rotated by the reactive force of the pumped fluid as it is discharged.

Another important object of the present invention is to provide a combination liquid propellant pump and injector of novel design and operating characteristics.

Other objects and advantages of the present invention will become apparent during the course of the following description.

In the drawings, two embodiments of the invention are shown. In this showing:

FIG. 1 is a central, longitudinal sectional view showing the improved fluid pump mounted on the head of a combustion chamber;

FIG. 2 is a transverse sectional view taken on the line 2—2 of FIG. 1;

FIG. 3 is a similar view taken on the line 3—3 of FIG. 1;

Figure 4:
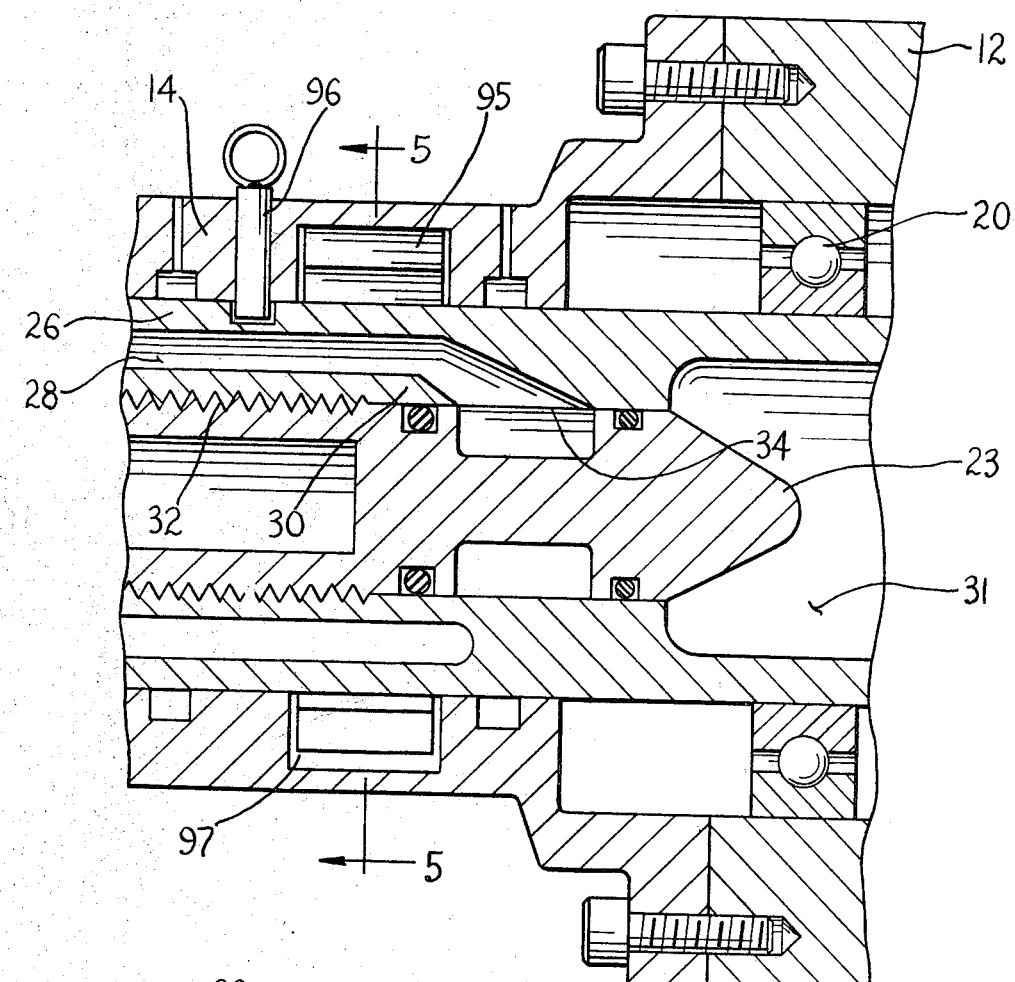
FIG. 4 is a fragmentary view similar to FIG. 1 showing a modified form of pump impeller rotating means.

In its broadest aspects, the feeding, pumping, etc. apparatus of the invention embodies a number of novel features per se as well as in various combinations to be described, most of which include the pump.

Referring to the drawings, numeral 10 designates the pump as a whole which includes: a main pump casing 12 and two forward casing portions 14 and 16 for ease in the assembly of the pump components; and impeller 18 journalled in the casing 12 and in the casing portion 14 by spaced ball and spaced plain bearings 20, 21 respectively; axially and radially disposed fluid supply conduits 22 and 24 suitably connected in leakproof manner to the casings 16 and 12; and poppet and sleeve valves 23, 25 respectively controlling fluid flow from the conduits 22 and 24.

The forward end of the shaft 26 of the impeller 18 is provided with a fluid passage 28 defined by an annular inner wall 30 having a threaded surface 32 which cooperates with the threaded outer surface of the poppet valve 23. The poppet valve is mounted in the wall 30 and closes the outlet port 34 of the fluid passage 28 prior to operational rotation of the fluid impeller 18. The forward end of the poppet valve 23 is provided with a radial extension 36 which moves axially in a longitudinally disposed groove 38 to an annular recess 40, both formed in the casing portion 16.

The impeller 18 is provided with blades 43 and 45 (FIG. 3), alternate ones 43 of which have passages in communication with its centrally located bore 31, and the others 45 having passages communicating with their connecting manifold 44. Fluid flow to the manifold from the conduit 24 is controlled by the sleeve valve 25 positioned over the radial flow ports 46. The outer surface 48 of the manifold 44 is screw-threaded and cooperates with the screw-threaded inner surface of the sleeve valve 25 to open the valve and ports 46 as will be described.

The sleeve valve 25 (like the poppet valve 23) is provided with a radial extension 50 which upon rotation of the impeller 18, moves axially in a longitudinally disposed groove 52 to an annular recess 54, both formed in the casing 12. The axially movable valve extensions 36 and 50 insure relative rotation of the poppet and sleeve valves 23 and 25 with respect to the rotating impeller 18 to move them forwardly or to the left (FIG. 1) to open them and permit flow into the impeller blades 43 and 45 from the fluid supply conduits 22 and 24. When the valve extensions reach the annular recesses 40 and 54, the valve ports 34 and 46 are fully open, the poppet valve 23 and the sleeve valve 25 are free to rotate with the impeller shaft 26 and their axial movement ceases.

The monopropellant fluid from the source of supply conduit 22 may now pass through the bore 31 and passages 43 to an annular injection chamber 57 and to an injector manifold 58 having injection ports 60 communicating with the combustion chamber 62 defined by the chamber wall 64, the head end of which is closed by the pump casing 12 and the impeller 18. The combustion chamber 62 terminates in a conventional convergent-divergent nozzle (not shown). It is to be noted that the injection chamber 57 includes a venturi 92, catalyst or decomposition section 91 which converts the monopropellant fluid into a high temperature gas and also discharges into the combustion chamber 62. More important, the axis of each injection chamber venturi 92 is canted axially for reasons to be described.

The pressurized fluid from the supply conduit 24 passes around the manifold 44, through the inlet ports 46 and through the impeller passages 45 to a manifold 66 positioned adjacent to and concentric with the manifold 58. The manifold 66 is provided with injection ports 68 which are disposed an arranged to direct injected fluid (which may be fuel or oxidizer) toward the fluid injected from venturi 92 and the ports 60. Thorough mixing of the fluids is thus effected. Depending on the specific propellants employed, and as just described, if a monopropellant such as hydrogen peroxide is employed, the injection manifolds 58 and 66 may be omitted and a catalyst 70 placed in the decomposition section 91 (FIG. 1) so as to effect decomposition into steam and hydrogen.

In operation with bi-propellants, at least one of which is a monopropellant, the impeller 18 is initially rotated by any of several means which are described below. At this time, the valves 23 and 25 will have been opened by their threaded connections with the impeller shaft 26 and the monopropellant fluid (fuel or oxidizer) from conduit 22 will pass through the canted injection chambers 57 and react in chambers 91 and discharge through venturi 92, and the reaction force will keep the impeller rotating while the fluids are injected into the combustion chamber therethrough and from the manifolds 58 and 66 and their injection ports 60 and 68.

As indicated the above description applies to a bi-propellant propellant combination in which one of the propellants is a monopropellant. It is the decomposition of the monopropellant and the discharge of the resulting gases through venturi 92 that provide the pumping power (i.e., rotates the impeller 18).

The principles of the invention permit great flexibility insofar as the use of a propellant or propellant combinations is concerned. For example, a single fluid or all monopropellant system may readily be utilized in the interests of utmost simplicity and would eliminate or render unnecessary the conduit 24, the sleeve valve 25, the manifold 44, the passage 45, the manifold 66, and the ports 68.

In a bi-propellant system in which one of the propellants is a pressurized gaseous fluid, the structure would be substantially as described but the decomposition bed 91 would be deleted. In a bi-propellant system where neither propellant is a monopropellant, a portion of both propellants would be ducted into the annular injection chamber venturis 57, 92 to provide the pumping (rotational) effect.

Ignition of the propellants pumped to the combustion chamber 62 is readily accomplished and depends upon the nature of the propellant or combinations of propellants employed. Obviously, if the propellant fluids are hypergolic, they ignite spontaneously on contact. If the fluids are non-hypergolic, but one is a monopropellant that is reacted or decomposed in the catalyst decomposition section 91, the gases issuing from the venturi 92 will be hot and thus provide the necessary ignition energy. If the propellants are non-hypergolic and solid propellant charges, as will be described, are used to initially rotate the impeller 18, the latter also provide the ignition energy.

Naturally, various types of sparking devices and means may be employed to ignite non-hypergolic propellants. Among these could be the use of a separate spark or hot wire igniter in chamber 62, or the use of permanent magnets on the rotating impeller 18 in conjunction with the housing 12 could form a magneto type spark ignition system. Optionally, an extension of the impeller 18 (not shown) could be caused to rub against the internal surfaces of the chamber wall 64 so as to produce sparks for ignition.

The pumping system can be initially rotated in various ways such as by a compressed gas or by the application to the impeller of a rotative mechanical force from an external source. As shown in FIG. 1, one or more remotely ignitible charges 72 arranged tangentially on the rear face of the impeller 18 and having a venturi type discharge into the chamber 62 can be utilized to effect a number of impeller revolutions pending the driving force supplied by the venturi 92.

Figure 5:
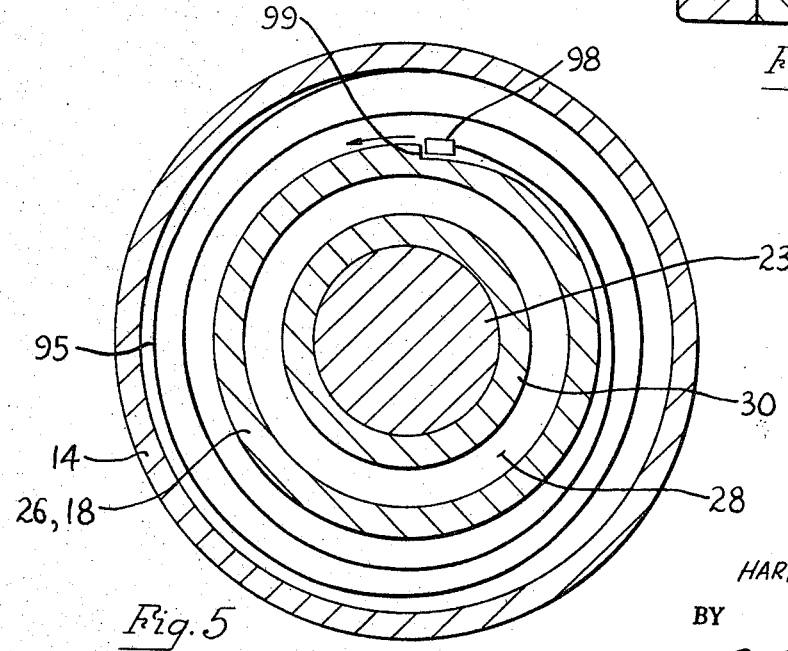
FIG. 5 is a cross-sectional view thereof taken on the line 5—5 of FIG. 4.

Another embodiment of the initial rotating means is disclosed in FIGS. 4 and 5 and comprises a torsion spring 95 fixed at one end to the casing 14 and at its other end to the impeller shaft 26 by an over-riding dog-recess type connection 98, 99. The spring may be wound up during or prior to installation in the assembly and the impeller prevented from rotation by a manually withdrawable detent 96.

What is claimed is:

1. A valve for a fluid pump having a casing, an impeller including a fluid passage rotatably mounted in the casing, and a fluid inlet conduit connected to said passage; comprising a member closing said passage and having a screw-threaded relative rotation connection with said impeller including screw threads on the passage closing member, cooperating screw threads on the impeller, means preventing rotation of the passage closing member with respect to the casing to cause said member to unscrew itself upon rotation of the impeller and thus cause an axial movement of the passage closing member to open said passage to allow fluid flow therethrough.

2. The valve recited in claim 1 wherein said fluid conduit is substantially axially disposed with respect to said passage.

3. The valve recited in claim 1 wherein said fluid conduit is substantially radially disposed with respect to said passage.

4. The combination recited in claim 1 wherein said member is a poppet.

5. The combination recited in claim 1 wherein said member is a sleeve.

6. In combination, a pump casing having a fluid inlet conduit communicating therewith; an impeller rotatably mounted in said casing for pumping fluid from said conduit to a discharge point; and valve means screw-threadedly mounted on said impeller and preventing fluid flow through a passage therein; said valve means including screw threads, cooperating screw threads on the impeller, means preventing rotation of the valve with respect to the casing to cause said member to unscrew itself upon rotation of the impeller and thus cause an axial movement of the valve to open the passage for fluid flow therethrough.

7. The combination recited in claim 6 wherein said fluid inlet conduit is substantially axially disposed with respect to the axis of said impeller.

8. The combination recited in claim 6 wherein said fluid inlet conduit is substantially disposed with respect to the axis of said impeller.

9. The combination recited in claim 7, and additional fluid inlet means communicating with said casing and disposed substantially radially with respect thereto.

10. The combination recited in claim 9 wherein separate valve means are provided to prevent the flow from said axially and radially disposed conduits.

11. A rocket powerplant comprising, in combination, a combustion chamber, a source of pressurized propellant, a pump casing including a flow passage closing the head end of said chamber and connecting it with said source, an impeller rotatably mounted in said passage to deliver propellant to said chamber, valve means mounted in said casing and closing said passage prior to rotation of said impeller, and said valve means is screw-threadedly mounted on said impeller and is movable to open position upon rotation of said impeller.

12. A propellant feeding system for the combustion chamber of a rocket engine comprising, in combination, a source of pressurized propellant fluid; a pump casing having a fluid flow passage connecting said source and the chamber; an impeller mounted in said passage for rotation by said pressurized fluid passing therethrough to the chamber, and means mounted on said impeller for effecting initial rotation thereof including a prewound torsion spring and a removable retainer for said spring.

13. A propellant feeding system for the combustion chamber of a rocket engine comprising, in combination, a source of pressurized propellant fluid; a pump casing having a fluid flow passage connecting said source and the chamber; valve means normally closing said passage and operable to open position upon rotation of said impeller; and a prewound torsion spring mounted on said impeller for effecting initial rotation thereof and a removable retainer for said spring.

References Cited

UNITED STATES PATENTS

| | | | |
|---|---|---|---|
| 2,536,601 | 1/1951 | Goddard | 60—39.27 |
| 2,542,121 | 2/1951 | Earl | 230—114 |
| 2,659,454 | 11/1953 | Bandli | 185—39 |
| 2,893,421 | 7/1959 | Brown | 251—267 |
| 2,985,425 | 5/1961 | Tang | 251—267 |
| 3,036,428 | 5/1962 | Chillson | 60—258 |

DOUGLAS HART, Primary Examiner

U.S. Cl. X.R.

60—258, 260, 39.74; 185—37; 103—103, 115, 228; 251—267

UNITED STATES PATENT OFFICE
CERTIFICATE OF CORRECTION

Patent No. 3,553,964          Dated   January 12, 1971

Inventor(s)   Hartmann J. Kircher, III

It is certified that error appears in the above-identified patent and that said Letters Patent are hereby corrected as shown below:

In the heading to the sheets of drawings, line 1, "H. J. HIRCHER III", each occurrence should read -- H. J. KIRCHER III --.

Signed and sealed this 25th day of May 1971.

(SEAL)
Attest:

EDWARD M. FLETCHER, JR.　　　　　　WILLIAM E. SCHUYLER, JR.
Attesting Officer　　　　　　　　　　Commissioner of Patents